June 7, 1960   E. ROBERTSON   2,939,571
TAKE-UP ARRANGEMENT
Filed July 11, 1958
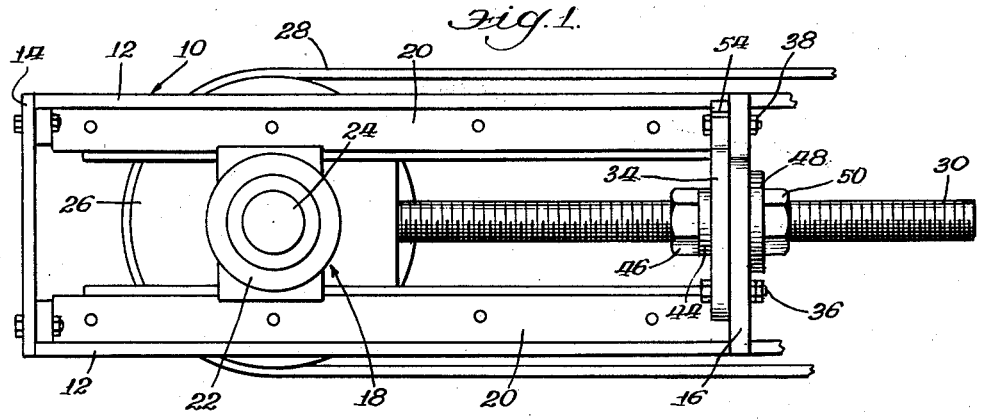
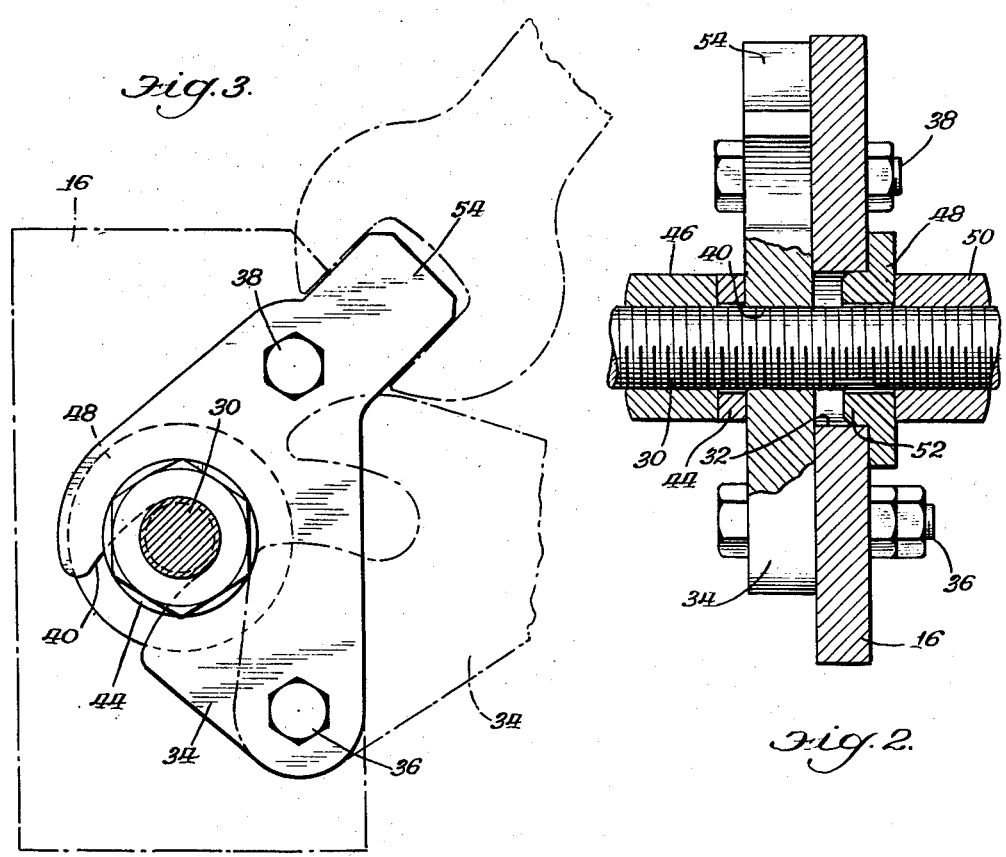
INVENTOR.
Evans Robertson
BY Walter L. Schlegel, Jr.
Atty.
Witness:
Ralph M. Faust

United States Patent Office 2,939,571
Patented June 7, 1960

2,939,571

TAKE-UP ARRANGEMENT

Evans Robertson, Lombard, Ill., assignor to Pipe Line Service Corporation, Franklin Park, Ill., a corporation of New Jersey Filed July 11, 1958, Ser. No. 748,037

7 Claims. (Cl. 198—208)

This invention relates to take-up arrangements and more particularly to a screw-type belt take-up arrangement which includes quick-release means for moving the belt pulley bearing and take-up screw to a position to provide slack in an associated conveyor without regard to the conventional adjusting means of the take-up arrangement.

When a continuous belt is utilized in a conveyor, means are generally provided for taking up slack in the belt. The take-up means usually includes an adjustment screw which is secured to pulley carrying bearing means slidable in guides longitudinally of the conveyor. The adjusting screw projects through a frame member on either side of which are positioned adjusting nuts. By loosening and tightening the nuts the tension on the associated conveyor belt may be adjusted. However, when a comparatively large amount of slack is to be provided in the conveyor belt as, for example, when the belt is to be repaired or replaced or slacked off for a prolonged idle period, all of the slack which is to be provided is derived by moving both of the adjusting nuts a corresponding distance on the screw. This process is time-consuming, tedious and can be difficult if the threads of the adjusting screw become rusty or fouled.

Accordingly, a primary object of the present invention is the provision of a conveyor belt take-up arrangement including novel means for quickly and easily providing slack in the conveyor belt.

It is also an object of this invention to provide a belt take-up arrangement for use with a take-up screw whereby a given amount of slack may be provided in the associated conveyor belt without the necessity of moving the adjusting nuts along the screw for that given distance.

Other objects and the advantages of the novel arrangement will become evident from the following specification and accompanying drawings, wherein:

Figure 1 is a side elevational view of a belt take-up arrangement incorporating the novel quick-release means as applied to a typical conveyor which is only fragmentarily illustrated;

Figure 2 is a longitudinal sectional view of the novel quick-release means as applied to a conveyor take-up screw, and Figure 3 is an end elevational view of the structure illustrated in Figure 2.

Referring to the drawings and particularly to Figure 1, it is seen that a conveyor end is indicated generally and fragmentarily at 10. The conveyor may be of any conventional construction but is illustrated in Figure 1 as comprising upper and lower longitudinal members 12 interconnected by an end plate 14 and a stationary thrust plate 16.

A conventional belt take-up or tightener arrangement is shown generally at 18 and comprises spaced guide members 20 secured in any desired manner to the longitudinal members 12. Bearing means 22, broadly comprising part of the member to be adjusted, are slidable in the guide members 20 in a direction longitudinally of the conveyor. It will be understood that separate bearing means are required for opposite ends of a conveyor shaft but only one such bearing means is illustrated in Figure 1. The bearing means 22 carry therein a shaft 24 on which is mounted a pulley 26 which in turn supports an endless conveyor belt 28.

Secured to the bearing means and movable therewith is a preferably nonrotatable take-up screw 30. The take-up screw is normally received through an opening 32 (Figure 2) in the plate 16. Adjacent the plate 16 there is provided a novel quick-release means which comprises a plate 34 pivotally mounted to the plate 16 by means of a pivot bolt 36. A locking bolt 38 is provided for the purpose of retaining the quick-release means in a position which accommodates adjustment of the take-up arrangement. It will be noted that the plate 34 is freely movable axially along the bolts 36 and 38 but is normally held in snug slidable engagement with the thrust plate 16.

The plate 34 is provided with a preferably arcuate slot 40 which is receivable over the screw 30 as best seen in Figure 3. A thrust washer 44 and adjusting nut 46 are received over the screw 30 on the side of the plate 34 opposite the plate 16. The washer 44 and adjustment nut 46 are of a size to be receivable through the opening 32 of plate 16, but are larger than the width of the slot 40 in plate 34 and therefore act as thrust members. Though the use of washer 44 is preferred, it is apparent that it could be omitted at which time the nut 46 would act alone as the thrust member. The take-up screw 30 is also provided with a shoulder thrust washer 48 and adjusting nut 50 on the side of the plate opposite the nut 46. The shoulder washer 48 is provided with a tapered nose portion 52 to serve the purpose of centering the screw 30 relative to the plate 16.

From the above description it is seen that the quick-release means plate 34 is movable to a position wherein the screw 30 is received in the slot 40. This position is shown by the solid lines in Figure 3. At this time slight adjusting movement of the bearing, pulley and belt is accommodated by means of the adjusting nuts 46 and 50. The plate 34 is also movable to another position (indicated by phantom line in Figure 3) wherein it is noninterposed between the washer 44 and plate 16. At this time the washer 44 and nut 46 are free to pass through the opening 32 of plate 16 and therefore the screw, bearings and belt pulley may be quickly moved a relatively great distance to provide a large amount of slack in the belt. To facilitate the movement of plate 34 to either of its pivotal positions, there may be provided a lug 54 arranged to receive thereover a wrench by means of which pivotal movement of the plate 34 is facilitated.

While the invention has been described particularly with reference to a conventional conveyor belt take-up arrangement, it is apparent that certain modifications might be made without departing from the spirit of the invention. For example, the washer 48 and the nut 50 may be eliminated and the device would still function properly provided the adjustable member were under some degree of tension. Furthermore, uses for the invention other than with a conveyor belt tightener are apparent, as for example in sprocket and chain devices or in quick-acting vices, and in certain instances it may be desirable to provide a rotatable take-up screw threadably received in the member which is to be adjusted. In the latter instance, the thrust member or nut 46 would be welded or otherwise secured to the screw for rotation therewith and adjustment would be obtained by merely rotating the nut. Quick release would still be accommodated in the manner described heretofore.

I claim:

1. In a take-up arrangement for an endless belt, the combination of: bearing means movable longitudinally of the belt; a frame member having an opening; a take-up screw secured to said bearing means and receivable through said opening; a pair of adjusting nuts threadably received on said screw on opposite sides of said member, one of said nuts being receivable through said opening for quickly releasing tension in said conveyor belt; and a pivotal member movable to a position between said frame member and said one nut, said pivotal member being movable away from said position to accommodate said quick-release.

2. In a take-up arrangement for an endless belt, the combination of: bearing means movable longitudinally of said belt; a frame member having an opening; a take-up screw secured to said bearing means and receivable through said opening; adjusting nuts threadably received on said screw on opposite sides of said member, one of said nuts being movable through said opening for quickly releasing tension in said belt; a pivotal member movable to a position between said frame member and said one nut, said pivotal member being movable from said position to accommodate said quick-release; and means for releasably locking said pivotal member in said position.

3. In a take-up arrangement for an endless belt, the combination of: pulley support means slidably movable longitudinally of said belt; a frame member having an opening; a take-up screw secured to said support means for movement therewith and receivable through said opening; adjusting nuts threadably received on said screw on opposite sides of said member, one of said nuts being movable through said opening for quickly releasing tension in said belt; a pivotal member secured to said frame member, said pivotal member having a slot receivable over said screw to prevent movement of said one nut through said opening and thereby accommodate adjustment of said support means by means of said nuts, said pivotal member being movable to a position accommodating movement of said one nut through said opening.

4. In a take-up arrangement according to claim 3, wherein said slot is arcuately formed to facilitate reception over said screw.

5. In a take-up arrangement for an endless belt, the combination of: belt pulley support means movable longitudinally of said belt; a frame member having an opening; a take-up screw secured to and movable with said support means and receivable through said opening; adjustment nuts threadably received on said screws for adjustably positioning said support means longitudinally of said belt; and quick-release means movable toward said screw to a position accommodating said adjustment, said last-mentioned means being movable away from said screw to another position accommodating free movement of said screw longitudinally of said belt independently of said adjustment means.

6. In a take-up arrangement for an endless belt of a conveyor, the combination of: pulley support means carried by said conveyor and movable longitudinally thereof; a transversely extending frame member having an opening therethrough; a nonrotatable take-up screw secured to said support means for movement therewith, said screw being substantially parallel to said belt and received through said opening; adjusting nuts threadably carried by said screw on opposite sides of said member, one of said nuts being receivable through said opening; a washer surrounding said screw and disposed between said member and the other nut, said washer being larger than said opening to prevent said other nut from being received therethrough; and quick-release means for selectively permitting or preventing reception of said one nut through said opening, said means comprising a plate pivotally secured to said member, a slot in said plate larger than said screw but smaller than said one nut; said plate being pivotable to a first position accommodating reception of said one nut through said opening for quickly providing slack in said belt; said plate being pivotable to a second position interposed between said one nut and said member and with the screw received in the slot whereby normal take-up of said belt may be accommodated.

7. In a take-up device for an adjustable member; the combination of an elongated threaded element, a thrust member carried thereby, at least one of said members having threaded engagement with said element, a fixed thrust plate having a hole through which said element extends, said hole being larger than the thrust member, a movable thrust plate interposed between the plate and thrust member in engagement with a surface of the latter facing said fixed plate whereby relative rotative movement between said element and said one member is effective to adjust the position of said adjustable member relative to the fixed plate, and means for moving said movable plate out of said engagement with said surface to permit the thrust member to pass through said hole during quick release of said device.

References Cited in the file of this patent

UNITED STATES PATENTS

| | | |
|---|---|---|
| 395,883 | Dodge | Jan. 8, 1889 |
| 1,527,378 | Orr | Feb. 24, 1925 |
| 1,592,239 | Warner | July 13, 1926 |
| 2,413,265 | Thompson | Dec. 24, 1946 |

FOREIGN PATENTS

| | | |
|---|---|---|
| 719,774 | Germany | Apr. 16, 1942 |